(12) United States Patent
Glover et al.

(10) Patent No.: US 11,277,482 B2
(45) Date of Patent: *Mar. 15, 2022

(54) OPERATIONS CONTROL OF NETWORK SERVICES

(71) Applicant: AT&T Intellectual Property I, L.P., Atlanta, GA (US)

(72) Inventors: Gregory Glover, Crystal Lake, IL (US); John Oetting, Zionsville, PA (US); George Dome, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,180

(22) Filed: Jul. 17, 2020

(65) Prior Publication Data

US 2020/0351358 A1 Nov. 5, 2020

Related U.S. Application Data

(63) Continuation of application No. 15/835,029, filed on Dec. 7, 2017, now Pat. No. 10,735,529.

(51) Int. Cl.
| | |
|---|---|
| *H04L 29/08* | (2006.01) |
| *H04L 12/24* | (2006.01) |
| *G06F 9/50* | (2006.01) |
| *H04L 12/26* | (2006.01) |
| *H04L 67/51* | (2022.01) |

(Continued)

(52) U.S. Cl.
CPC ........... *H04L 67/16* (2013.01); *G06F 9/5077* (2013.01); *H04L 41/046* (2013.01); *H04L 41/0816* (2013.01); *H04L 43/062* (2013.01); *H04L 43/0805* (2013.01); *H04L 43/16* (2013.01);
(Continued)

(58) Field of Classification Search
None
See application file for complete search history.

(56) References Cited

U.S. PATENT DOCUMENTS

| | | |
|---|---|---|
| 4,843,541 A | 6/1989 | Bean et al. |
| 7,697,536 B2 | 4/2010 | Basso et al. |

(Continued)

FOREIGN PATENT DOCUMENTS

| | | |
|---|---|---|
| CN | 102724057 A | 10/2012 |
| CN | 103473062 B | 1/2017 |

(Continued)

OTHER PUBLICATIONS

Liogkas et al.; "Automatic Partitioning for Prototyping Ubiquitous Computing Applications"; IEEE Pervasive Computing 3.3; 2004; p. 40-47.

(Continued)

*Primary Examiner* — Mohamed Ibrahim
(74) *Attorney, Agent, or Firm* — Guntin & Gust, PLC; Robert Gingher

(57) ABSTRACT

Methods, systems, and apparatuses, for real-time operation control, among other things. There may be adjustments to a first device in which a first network service operates. The adjustment to the device may include moving a second network service of the first device to a second device. The first network service and the second network service may be associated with virtual machines.

20 Claims, 9 Drawing Sheets

(51) Int. Cl.
    *H04L 41/046*     (2022.01)
    *H04L 43/062*     (2022.01)
    *H04L 41/0816*     (2022.01)
    *H04L 43/16*     (2022.01)
    *H04L 43/0805*     (2022.01)
    *H04L 29/06*     (2006.01)
    *H04L 41/0893*     (2022.01)

(52) U.S. Cl.
    CPC ...... *H04L 41/0893* (2013.01); *H04L 63/1425* (2013.01)

(56) References Cited

U.S. PATENT DOCUMENTS

| | | |
|---|---|---|
| 7,792,050 B2 | 9/2010 | Metke et al. |
| 7,843,843 B1 | 11/2010 | Papp, III et al. |
| 8,560,628 B2 | 10/2013 | Ganti et al. |
| 8,594,080 B2 | 11/2013 | Fleming et al. |
| 8,812,653 B2 | 8/2014 | Chandrasekaran |
| 9,215,619 B2 | 12/2015 | Aguirre et al. |
| 9,218,100 B2 | 12/2015 | Diament et al. |
| 9,392,432 B2 | 7/2016 | Karaman |
| 9,432,257 B2 | 8/2016 | Li et al. |
| 9,549,026 B2 | 1/2017 | LaCapra |
| 9,558,207 B1 | 1/2017 | McAlister et al. |
| 9,641,401 B2 | 5/2017 | Varney et al. |
| 9,667,506 B2 | 5/2017 | Varney et al. |
| 9,729,424 B2 | 8/2017 | Yin et al. |
| 2004/0090923 A1 | 5/2004 | Kan et al. |
| 2008/0049626 A1* | 2/2008 | Bugenhagen ....... H04L 41/5035 370/241 |
| 2013/0279354 A1 | 10/2013 | Ekman et al. |
| 2013/0312005 A1 | 11/2013 | Chiu et al. |
| 2013/0322265 A1* | 12/2013 | Kozisek .............. H04L 43/0894 370/251 |
| 2014/0115147 A1* | 4/2014 | de Assuncao ........... H04L 41/50 709/224 |
| 2014/0223017 A1 | 8/2014 | Lipstone et al. |
| 2014/0258412 A1 | 9/2014 | Li et al. |
| 2014/0328190 A1 | 11/2014 | Lord et al. |
| 2015/0106407 A1 | 4/2015 | Adayilamuriyil et al. |
| 2016/0248658 A1 | 8/2016 | Patel et al. |
| 2016/0381069 A1 | 12/2016 | Chelsa et al. |
| 2017/0034359 A1 | 2/2017 | Yasrebi et al. |
| 2017/0105144 A1 | 4/2017 | Strand et al. |

FOREIGN PATENT DOCUMENTS

| | | |
|---|---|---|
| EP | 0301275 B1 | 6/1994 |
| WO | WO 2011/157708 A1 | 12/2011 |
| WO | WO 2015/035774 A1 | 3/2015 |

OTHER PUBLICATIONS

Richard et al.; "The ADEPT Framework for Intelligent Autonomy"; Charles Stark Draper Lab Inc.; Cambridge MA; RTO AVT Course on Intelligent Systems for Aeronautics; May 2002; 13 pages.

Tilevich et al.; "Automatic Application Partitioning: The J-Orchestra approach"; 8$^{th}$ ECOOP workshop on Mobile Object Systems; 2002.

Neeta S. Singh; "An automatic code generation tool for partitioned software in distributed computing"; Scholar Commons; University of South Florida; Theses and Dissertations; Mar. 2005; 53 pages.

* cited by examiner

OPERATIONS CONTROL OF NETWORK SERVICES

CROSS REFERENCE TO RELATED APPLICATIONS

This application is a continuation of, and claims priority to, U.S. patent application Ser. No. 15/835,029, filed Dec. 7, 2017, entitled "Operations Control of Network Services," the entire contents of which are hereby incorporated herein by reference.

BACKGROUND

Network Function Virtualization (NFV) and Software Defined Networking (SDN) offer the potential for unlimited flexibility: the ability to provide any capability via a network to any device, anytime, anywhere, and in near-real time. Intelligent partitioning is critical to supporting that flexibility while still ensuring service level requirements are met in a cost efficient and risk adverse manner. For example, virtualization can be used to create separate failure zones. In addition, through the use of geo-location and affinity/anti-affinity rules one can not only recreate a three-plane virtual separation model but create entirely new partitions which can be designed to further enhance service reliability.

SUMMARY

NFV and SDN capabilities can be tuned to provide extensive flexibility in design and implementation. Disclosed herein are methods, systems, and apparatuses, for real-time operation control, among other things. Operations may be controlled in a way to provide insights with regard to network service operation as well as automatically adjust network services. For example, there may be adjustments to a first device in which a first network service operates. The adjustment to the device may include moving a second network service of the first device to a second device. The first network service and the second network service may be associated with physical or virtual (logical) machines.

Disclosed herein are methods, systems, and apparatuses, for real-time operation control, among other things. Operations may be controlled in a way to provide insights with regard to network service operation as well as automatically migrate network services. For example, there may be a migration of one or more services common to a first product mix of services and a second product mix of services to a first device.

The present disclosure is directed to an apparatus having a processor and a memory coupled with the processor. The processor effectuates operations including receiving information associated with a first network service, the information comprising a measured performance of the first network service associated with a first device during a period. The processor further effectuates operations including determining that the measured performance over the period is different from an expected performance of the first network service. The processor further effectuates operations including providing instructions to make an adjustment to the first device on which the first network service operates, wherein the adjustment to the first device comprises moving a second network service of the first device to a second device, wherein the first network service is a different type of service than the second network service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The methods and systems associated with the operation control panel is envisioned of a new class of operations modeling tools that may integrate network operations costs, infrastructure costs, service level tiers, or capacity forecasting and planning data. The disclosed system may help a service provider monitor and measure the effectiveness of a service and an underlying network for the service.

Software defined networking (SDN) introduces the opportunity to enable combinations of products and services potentially on any device, anytime, or anywhere. This same opportunity also introduces challenges in terms of managing these products and services efficiently, accurately, and reliably. In addition, the task of product design becomes more complex given the potentially unlimited mix of operations costs and levels of service. To that end methods for service providers should effectively understand questions such as: What are the most sensitive cost factors in an environment for service and how does changing them affect service levels; What are the optimal mix of human resources and automation (or the like) needed to manage a changing mix of physical and logical resources? How does the service provider assess potential products and pricing given unrestricted flexibility in terms of service level offerings and associated operational costs?

The subject matter disclosed herein combines previously disparate and isolated data sets into a single set of models. It may be based on SDN operations functions, and include such factors as resource costs, infrastructure costs, service levels, levels of automation, and the like. The disclosed methods and systems may utilize optimization algorithms and other analytics methodologies to present conclusions, both for daily operations use and well as executive recommendations. The disclosed system and method for an operations control panel may perform "what if" analysis for operations. For instance, what would be the impact on operations staffing or service levels if automation was increased for a service?

Figure 1:
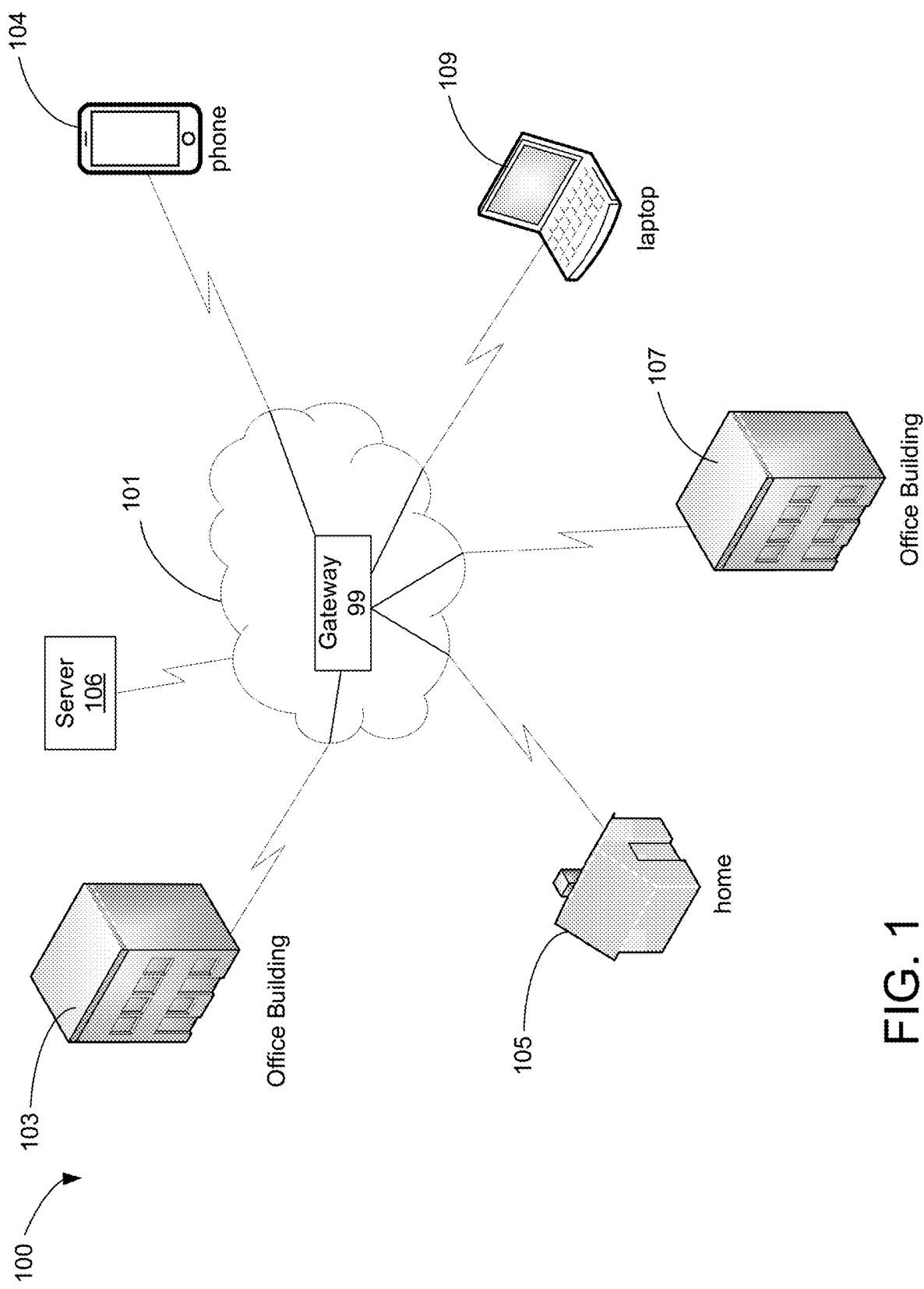
FIG. 1 illustrates an exemplary system that may support one or more network services.

FIG. 1 illustrates an exemplary system 100 that may support one or more network services. Services may include virtual private networks (VPNs), wireless services (e.g., WiFi services), Ethernet services, telephony services, video services, storage area network services, or domain name system (DNS) services, among others. As illustrated, there may be multiple devices connected with network 101 via gateway device 99 or the like. There may be mobile device 104 or laptop 109. Business and home networks, such as business network 103, business network 107, or home network 105 may also be connected with network 100 and include one or more devices (e.g., mobile device 103 or laptop 109).

Figure 2:
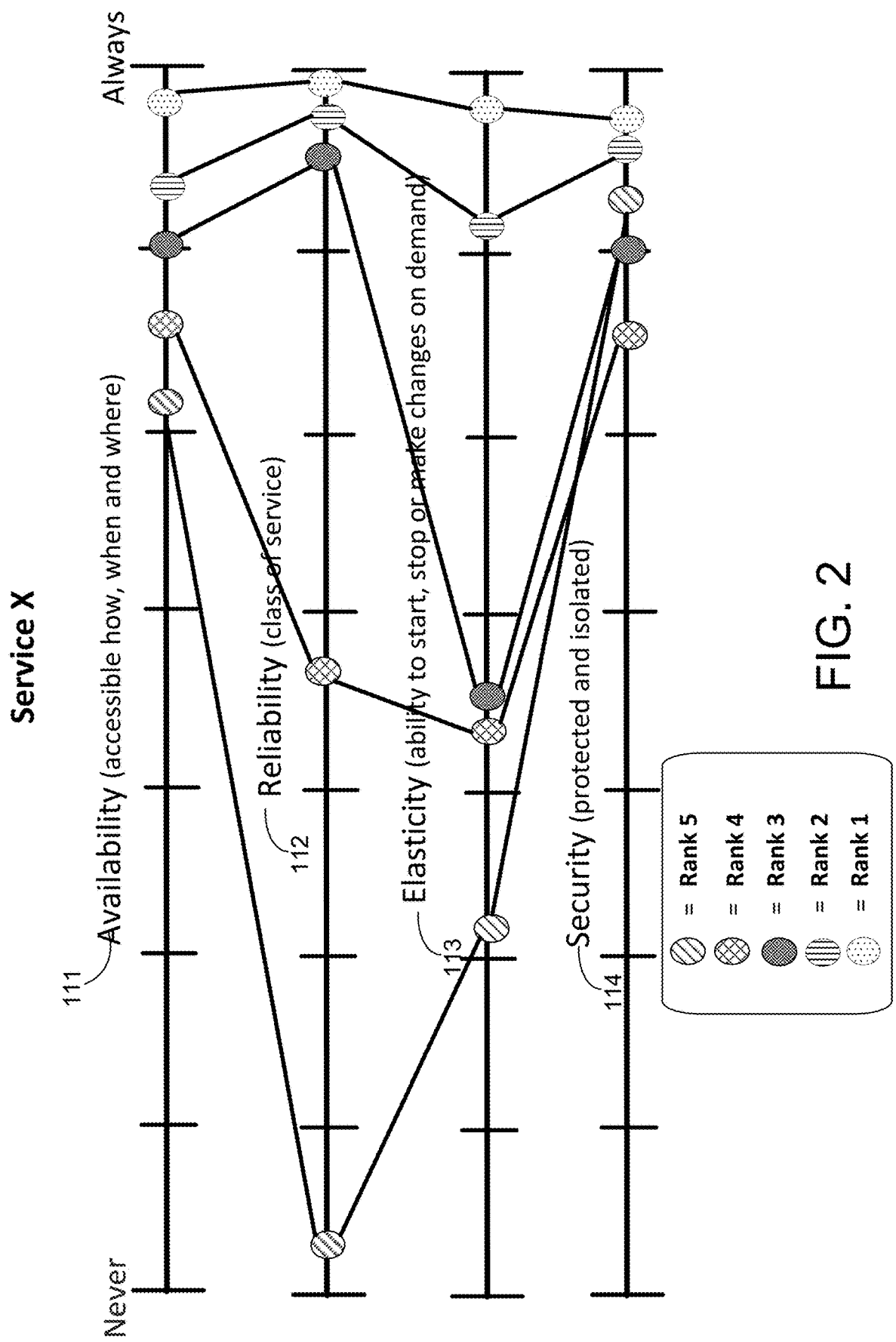
FIG. 2 illustrates exemplary information for expected performance parameters that may be used in methods or systems disclosed herein.

FIG. 2 illustrates exemplary information for expected performance parameters that may be used in methods or systems disclosed herein. As shown in FIG. 2, there may be expected performance parameters of service X (e.g., availability, reliability, elasticity, or security). The expected performance may be based on an average or median parameter across a network that uses the services. Availability 111 may correspond to accessibility with regard to how, when, and where a service is available. Reliability 112 may correspond to whether a service is best effort, assigned a quality of service (e.g., packet prioritization), or network redundancy (e.g., dual homing or ring configuration). Elasticity 113 may correspond to a fixed speed, whether a user can change the speed (e.g., via web interface or automatically based on reaching a time or threshold), or billed only for time or bandwidth used. Security 114 may correspond to susceptibility to attacks based on technology used in a service (e.g., VPN or Firewall) and actual success or number of attacks (e.g., viruses, unauthorized hacking, denial-of-service attack, or Distributed denial of service (DDoS)) to disrupt a service. Availability, reliability, elasticity, or security, among other things may be measured throughout the lifecycle of a service.

With continued reference to FIG. 2, service X may have 5 different rankings (e.g., Rank 1-Rank 5). These rankings may correspond to different expected parameters as shown in FIG. 2, in which Rank 5 is the lowest ranking (e.g., min cost and min performance guarantees or features) and Rank 1 is the highest ranking (e.g., max cost and max performance guarantees or features).

Figure 3A:
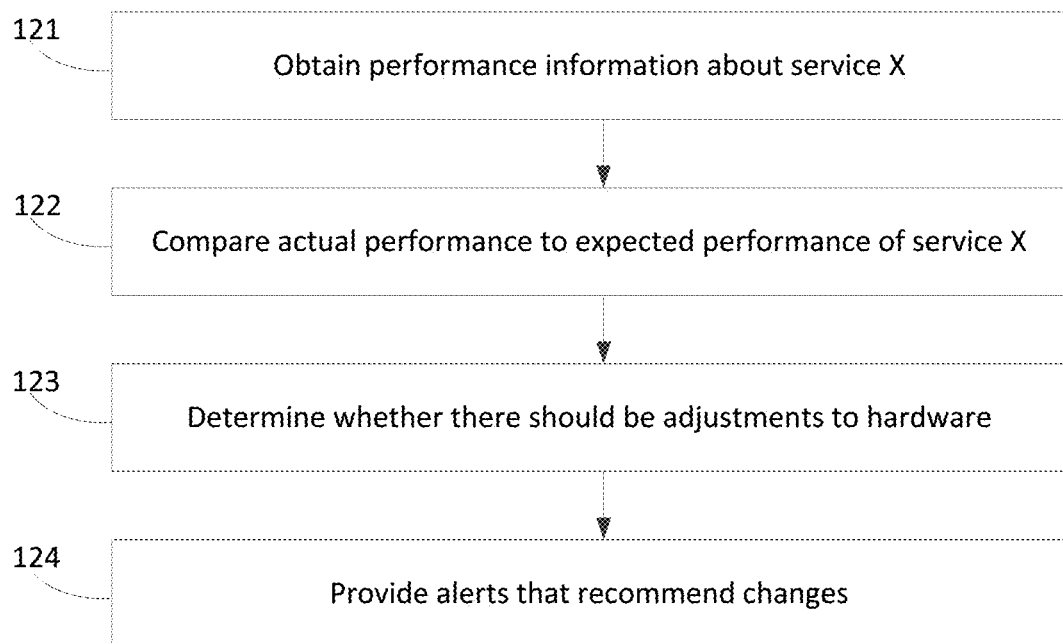
FIG. 3A illustrates an exemplary method for operations factory control associated with a particular type of service.

FIG. 3A illustrates an exemplary method for operations factory control associated with a particular type of service (e.g., Ethernet service or VPN service). At step 121, server 106 may obtain actual information about service X for a period. The information may include the costs to provide service X, such as access cost 145, infrastructure cost history 148, resource cost history 146, operations cost history 144, or 3rd party cost 147, among others. In addition, the information may include the actual (measured) performance and other parameters of the service within the period. The actual performance may be associated with availability, reliability, elasticity, or security, as disclosed herein. The other parameters may include level of automation, degree of homogeneity, amount of resiliency, or process, among other things. Automation parameters may be considered parameters that help define the level of automation (e.g., programmatic code) used to implement or maintain service X without human intervention, which may include the number of times a particular user (e.g., service operator or end user) had to make manual adjustments to maintain service X. Homogeneity parameters may be considered parameters that help define how many different vendors, types of hardware (e.g., servers, routers, interfaces), or types of software that are required to implement or maintain a service. It is contemplated herein, that the actual information may be obtained for the service on one or more levels, such as a gateway level (e.g., services connected with one gateway device), point of presence (POP) level (e.g., services connected with multiple gateway devices), a city metro area level (e.g., multiple POPs), or the like. To simplify the example, for the method of FIG. 3A, the gateway level (e.g., gateway 99 of FIG. 1) is considered.

At step 122, the measured (e.g., actual) performance parameters of a rank (e.g., Rank 5) for service X may be compared by server 106 to the expected performance parameters over a period for gateway 99. Although for this example, the measured performance may be the performance of service X alone (e.g., all customers that are using the service X on gateway 99), it is contemplated herein that the measured performance may be adjusted to incorporate just a particular customer, type of customer (e.g., type based on business size, business category, city, county, state, demographic, etc.), or the like. Based on the comparison of step 122, server 106 may determine whether there should be adjustments to hardware or software (step 123) or provide alerts that recommend changes (step 124). For example, server 106 may determine that the ranks should be adjusted for new installations of the service and provide an alert with a recommended adjusted (e.g., new) rank. In another example, server 106 may determine that a facility (e.g., hardware) should be upgraded (or does not need an upgrade) and provide an alert with the recommended facility upgrade. Adjustments to hardware or software may include replacing modules in the hardware, connecting the interfaces of the hardware differently, replacing the hardware with another hardware, adjusting the temperature of a room that the hardware resides (e.g., the hardware may not be at the optimal temperature), increasing bandwidth, increasing memory, or increasing other hardware capacity, among other things (e.g., hardware components in FIG. 5-FIG. 7B). Adjustments to software may include changing the software to a different version (upgrading or downgrading), including another piece of software to the current software, moving a service Y on the hardware to another hardware (e.g., removing service Y and keeping service X to improve the performance of service X), or manipulating a virtual machine (e.g., deleting VM from the hardware), among other things (e.g., virtual functions or other software of FIG. 7A-FIG. 7B).

Figure 3B:
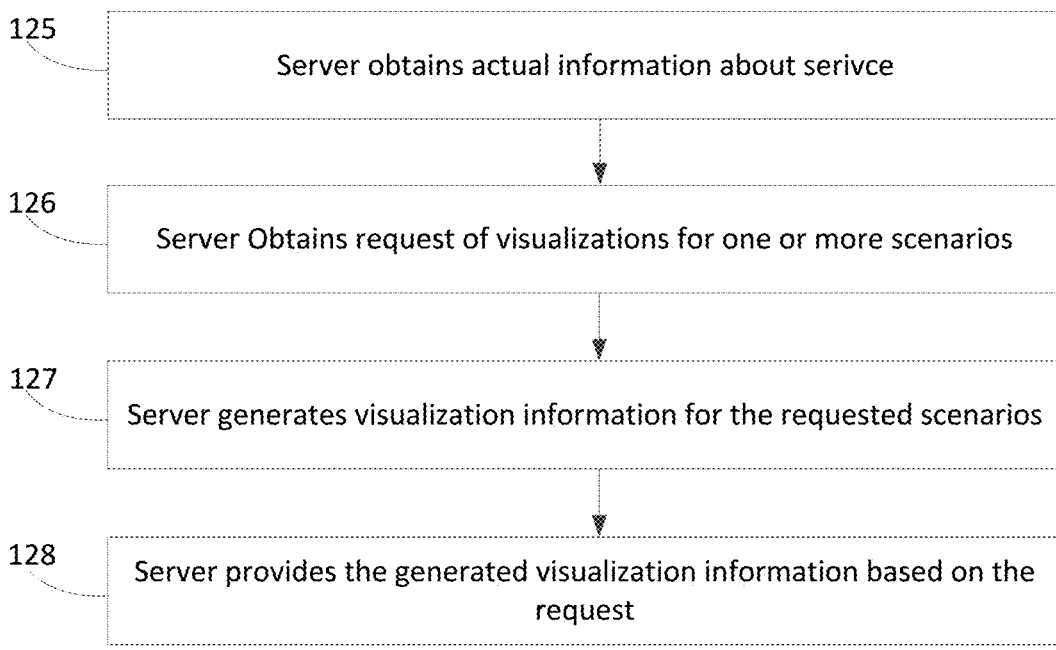
FIG. 3B illustrates another exemplary method associated with an operations factory panel.
Figure 4A:
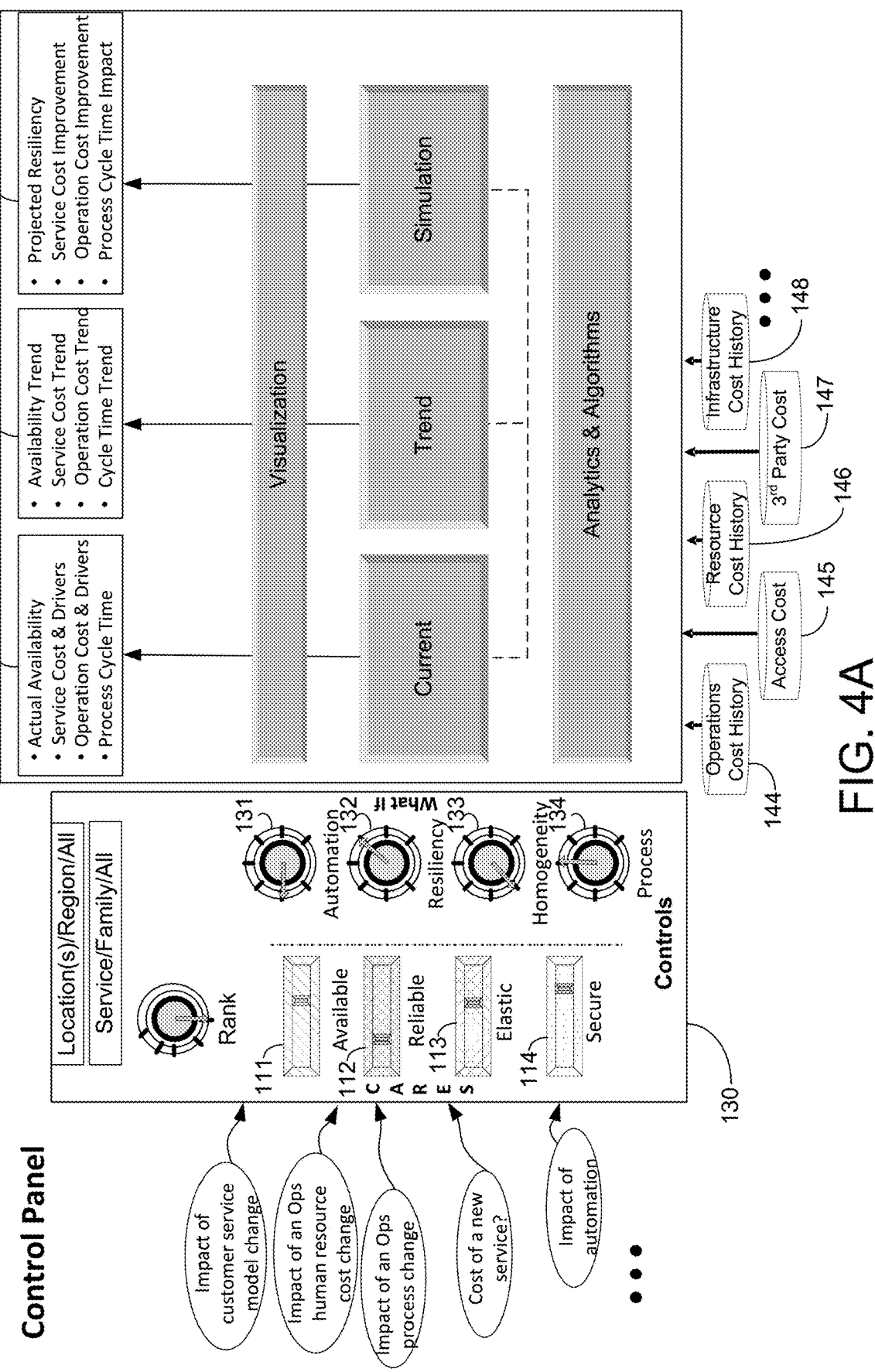
FIG. 4A illustrates an exemplary user interface.

FIG. 3B illustrates another exemplary method associated with an operations factory panel. At step, 125, similar to step 121, server 106 obtains actual information about service X (or multiple services) for different users (which may be all users) of service X (e.g., a first business and second business). At step 126, server 106 may obtain a request for visualizations based on one or more scenarios. The request may be based on information from a user interface as shown in FIG. 4A. The scenarios may be "what-if" scenarios based on a turn of a virtual knob or the like that are associated with automation (knob 131), resiliency (knob 132), homogeneity (knob 133), or process (knob 134), among others. Different visualizations may be for the approximate current period (e.g., near real-time), trend (e.g., past few weeks, months, or years), or simulation (e.g., forecast of the next few weeks, months, or years). At step 127, server 106 may generate visualization information based on the request of step 126. Homogeneity 133 will be used for illustrative purposes of the method of FIG. 3B. The request of step 126 may include a request for a comparison of performance (e.g., trend of availability, reliability, or security over the last 5 months) of different customers off of gateway 99 using service X that have 75% (or more) of the same model of devices using service X versus 25% (or less) of the same model of devices using service X. At step 128, server 106 may provide the generated visualization information of step 127 to be displayed.

Figure 4B:
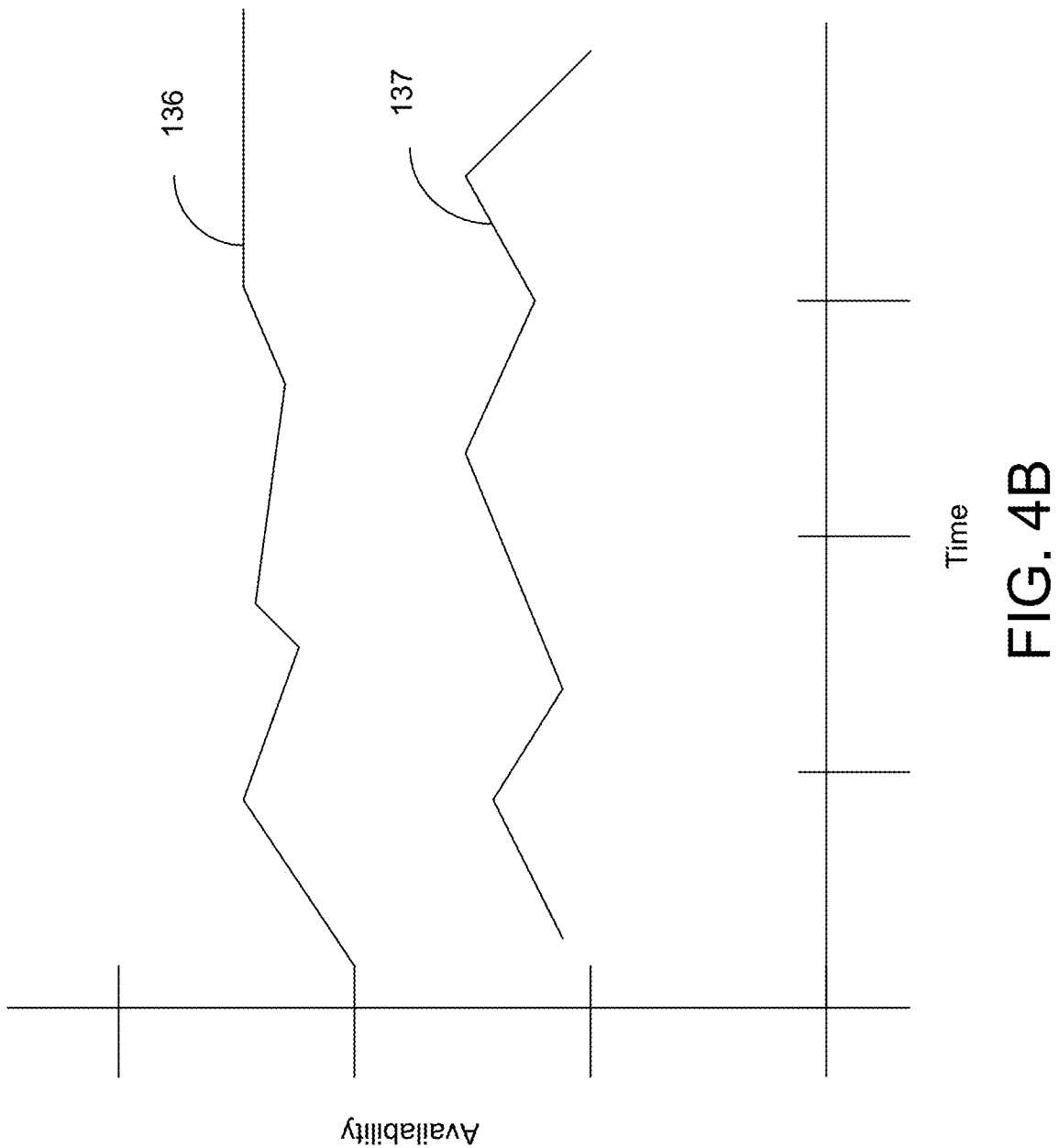
FIG. 4B illustrates exemplary visualization information.

FIG. 4B illustrates exemplary visualization information provided in step 128. Line 137 may be availability for 75% homogeneity and line 136 may be for 25% homogeneity. This allows for decision making, providing information, and changing a service of a network that was not easily available before. For example, in the aforementioned homogeneity example, a sales team of the service provider of service X may be able to quickly determine whether to provide a new customer a discount on their service based on homogeneity. An operations team of the service provider may be able to determine whether to do upgrades (e.g., how to prioritize upgrades) of service provider network hardware or software, whether to restrict service X operation via gateway 99 to particular device for increased performance, whether to route particular devices that use service X via gateway 99 for increased performance, or the like.

Further considering the above with regard to the operations control panel, it is contemplated herein that the methods and systems herein may be used to evaluate the performance of different product mixes on gateway 99 (or other levels) and help to automatically (based on a threshold) display visualizations or change network configurations to increase performance. For example, if it is found based on a trend analysis that a first product mix (e.g., Service X and Service Y) with a first type of gateway shows better performance together (e.g., better availability) than a second product mix (Service X and Service Z) at a second type of gateway, then there may be automatic migration of Service X (or Service Z) when a gateway of the first type becomes available. Also, proactively, initial installations of Service X or Service Z may be prioritized to a gateway found to have the most efficient performance (or the like) for the product mix. It is contemplated that the more efficient performance (or the like) gateway may not always be available during initial installation and when new gateways come on line or otherwise become available, then a move of the service to suit the product mix (or device mix) with the better (e.g., most efficient performance) performance may be done. Although a gateway is disclosed herein, other devices that provide the services are contemplated for the examples herein.

There may be multiple benefits associated with the methods and systems disclosed herein. The methods and systems disclosed herein may enable product managers or service designers to perform "what if" operation or pricing scenarios based on various service level options. The methods and systems disclosed herein may identify the operational functions (e.g., functions associated with a service, such as a virtualized or SDN component), which have the most potential for improved efficiencies, quality, or cost savings through operations such as automation or homogeneity.

Figure 5:
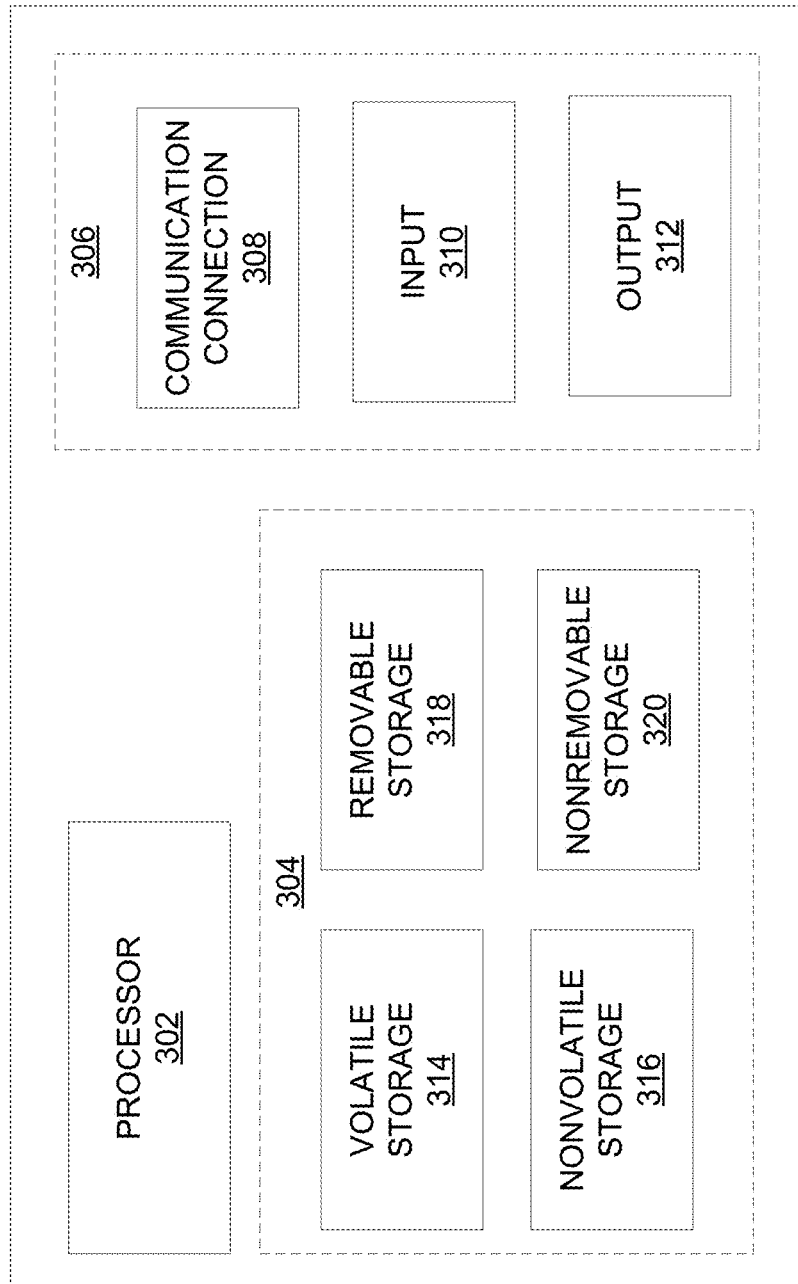
FIG. 5 illustrates a schematic of an exemplary network device.

FIG. 5 is a block diagram of network device 300 that may be connected with or comprise a component of FIG. 1. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
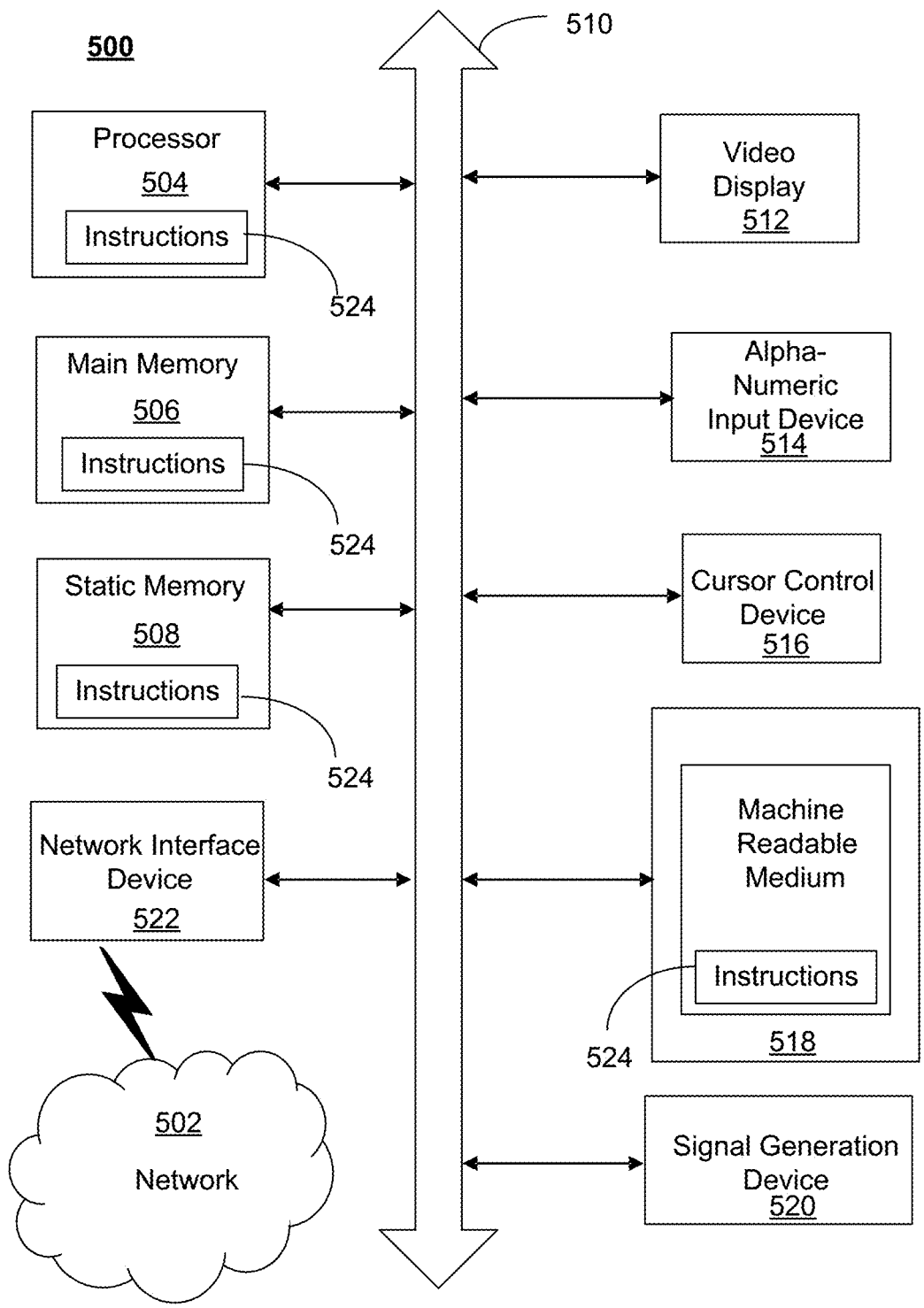
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 104 or laptop 109, and other devices of FIG. 1. In some examples, the machine may be connected (e.g., using a network 101) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure (e.g., step 128) may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7A:
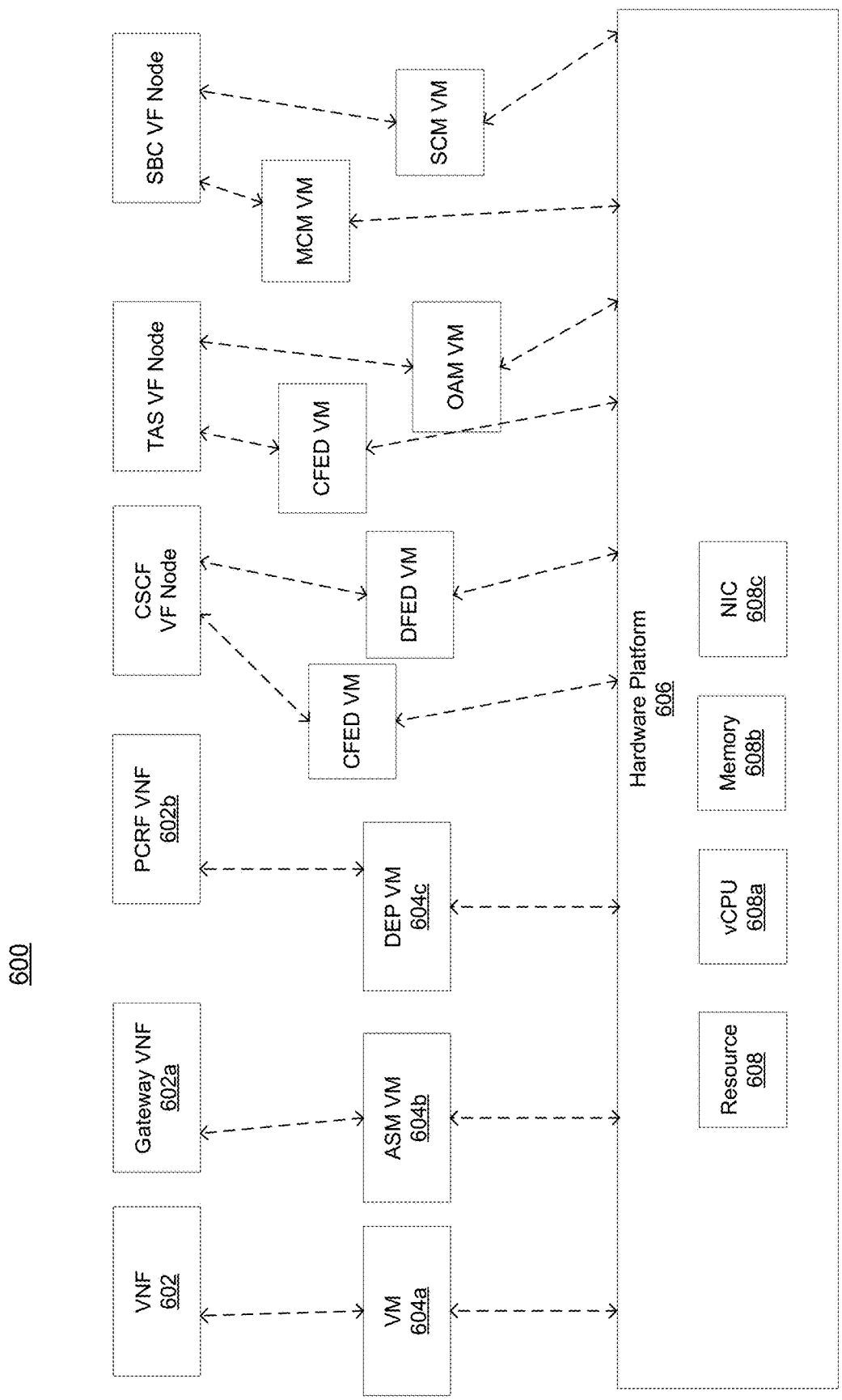
FIG. 7A is a representation of an exemplary network.

FIG. 7A is a representation of an exemplary network 600. Network 600 (e.g., of FIG. 1) may comprise an SDN, for example, network 600 may include one or more virtualized functions implemented on general purpose hardware, such as in lieu of having dedicated hardware for every network function. For example, general purpose hardware of network 600 may be configured to run virtual network elements to support communication services, such as mobility services, including consumer services and enterprise services. These services may be provided or measured in sessions.

A virtual network functions (VNFs) 602 (e.g., VNFs 101) may be able to support a limited number of sessions. Each VNF 602 may have a VNF type that indicates its functionality or role. For example, FIG. 7A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, in FIG. 7A there may be an advanced services module (ASM) VM 604b, a DEP VM 604c, CFED VM, DFED VM, OAM VM, management control module (MCM) VM, SCM VM, or the like. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608. The automatic movement of VNF's is contemplated based on reaching particular thresholds regarding performance parameters, mix of products, etc. as disclosed herein (e.g., FIG. 2A, FIG. 2B).

Figure 7B:
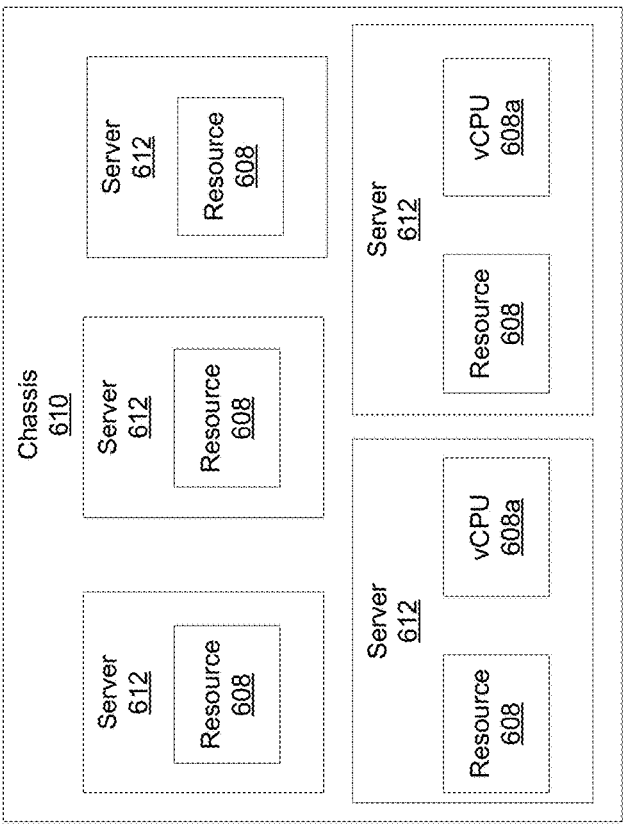
FIG. 7B is a representation of an exemplary hardware platform for a network.
Figure 7B:
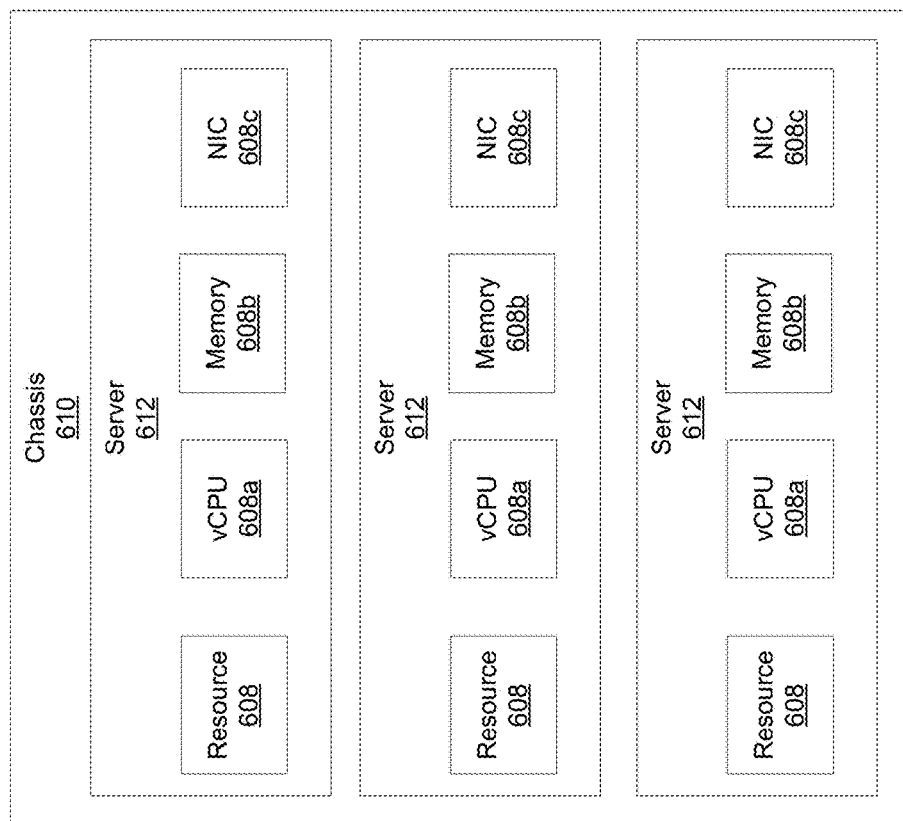

While FIG. 7A illustrates resources 608 as collectively contained in hardware platform 606, the configuration of hardware platform 606 may isolate, for example, certain memory 608c from other memory 608c. FIG. 7B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 7B illustrates that the number of servers 612 within two chasses 610 may vary. Additionally or alternatively, the type or number of resources 608 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (for example, consume resources from) the same server 612 or chassis 610. For example, if VNF 602 uses six VMs 604a, an affinity rule may dictate that those six VMs 604a be instantiated on the same server 612 (or chassis 610). As another example (not specifically shown in figure), if VNF 602 uses VMs 604a, ASM VMs 604b, and a third type of VMs 604, an affinity rule may dictate that at least the VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that VM 604a be instantiated on a particular server 612 that does not contain any ASM VMs 604b. As another example, an anti-affinity rule may require that VMs 604a for a first VNF 602 be instantiated on a different server 612 (or chassis 610) than VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein operations control panel are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which messages for implementing operation control panel and other systems have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—operations control panel—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein for operation control, among other things. A method, system, computer readable storage medium, or apparatus may: obtain information associated with a first network service, the information comprising measured performance of the first network service that operates via a first device during a first period; compare the measured performance at the first period to an expected performance of the first network service; and based on the comparison of the measured performance to the expected performance of the first network service has reached a first threshold, provide instructions to make an adjustment to the first device in which the first network service operates. The adjustment to the first device includes moving a second network service of the first device to a second device, wherein the first network service is a different type of service than the second network service. The adjustment to the first device includes configuring on the first device the service types of a second device that includes a service similar to the first network service; for example, a first type of service X and a second type of service X that operate substantially independently of each other. The information associated with the first network service includes availability of the service; for example, percent of time available or number of times unavailable in a period. The information associated with the first network service includes percentage of automation of the service. The information associated with the first network service includes the amount of homogeneity of devices that interact with the first network service. The information associated with the first network service includes a number of denial of service attacks. Further steps may include that based on the comparison of the measured performance to the expected performance of the first network service has reached a first threshold, providing further instructions to display a graph comprising a trend of the availability of the service. All combinations in this paragraph (including the removal or addition of steps) are contemplated in a manner that is consistent with the other portions of the detailed description.

What is claimed:

1. An apparatus comprising:
 a processor; and
 a memory coupled with the processor, the memory storing executable instructions that when executed by the processor cause the processor to effectuate operations comprising:
  receiving information associated with a first network service, the information comprising a measured performance of the first network service associated with a first device during a period;
  determining that the measured performance over the period is different from an expected performance of the first network service; and
  providing instructions to make an adjustment to the first device on which the first network service operates, wherein the adjustment to the first device comprises moving a second network service of the first device to a second device, wherein the first network service is a different type of service than the second network service.

2. The apparatus of claim 1, wherein the expected performance is based on an average or median parameter for a network using the first network service.

3. The apparatus of claim 1, wherein the information is based on a gateway level, a point on presence level, or a city metro level associated with the first network service and the second network service.

4. The apparatus of claim 1, the operations further comprising:
 determining a rank associated with the measured performance of the first network service; and
 adjusting the rank based on a new installation of the first network service.

5. The apparatus of claim 1, wherein moving the second network service of the first device to the second device is in response to the second device being a new device that has come online.

6. The apparatus of claim 1, wherein the first device is a gateway of a first type and the second device is a gateway of a second type.

7. The apparatus of claim 1, wherein the measured performance is adjusted based on a type of customer.

8. A method comprising:
 receiving, by a processor, information associated with a first network service, the information comprising a measured performance of the first network service associated with a first device during a period;
 determining, by the processor, that the measured performance over the period is different from an expected performance of the first network service; and
 providing, by the processor, instructions to make an adjustment to the first device on which the first network service operates, wherein the adjustment to the first device comprises moving a second network service of the first device to a second device, wherein the first network service is a different type of service than the second network service.

9. The method of claim 8, wherein the expected performance is based on an average or median parameter for a network using the first network service.

10. The method of claim 8, wherein the information is based on a gateway level, a point on presence level or a city metro level associated with the first network service and the second network service.

11. The method of claim 8 further comprising:
 determining a rank associated with the measured performance of the first network service; and
 adjusting the rank based on a new installation of the first network service.

12. The method of claim 8, wherein moving the second network service of the first device to the second device is in response to the second device being a new device that has come online.

13. The method of claim 8, wherein the first device is a gateway of a first type and the second device is a gateway of a second type.

14. The method of claim 8, wherein the measured performance is adjusted based on a type of customer.

15. A computer-readable storage medium storing executable instructions that when executed by a computing device cause said computing device to effectuate operations comprising:
 receiving information associated with a first network service, the information comprising a measured performance of the first network service associated with a first device during a period;
 determining that the measured performance over the period is different from an expected performance of the first network service; and
 providing instructions to make an adjustment to the first device on which the first network service operates, wherein the adjustment to the first device comprises moving a second network service of the first device to a second device, wherein the first network service is a different type of service than the second network service.

16. The computer-readable storage medium of claim 15, wherein the expected performance is based on an average or median parameter for a network using the first network service.

17. The computer-readable storage medium of claim 15, wherein the information is based on a gateway level, a point on presence level or a city metro level associated with the first network service and the second network service.

18. The computer-readable storage medium of claim 15, the operations further comprising:
 determining a rank associated with the measured performance of the first network service; and
 adjusting the rank based on a new installation of the first network service.

19. The computer-readable storage medium of claim 15, wherein moving the second network service of the first device to the second device is in response to the second device being a new device that has come online.

20. The computer-readable storage medium of claim 15, wherein the measured performance is adjusted based on a type of customer.

\* \* \* \* \*